United States Patent Office 3,698,853
Patented Oct. 17, 1972

3,698,853
FRAY RESISTANT CATGUT SUTURES
Barrie Alexander Wilson, Sylvania, New South Wales, Australia, assignor to American Cyanamid Company, Stamford, Conn.
No Drawing. Filed Oct. 31, 1969, Ser. No. 873,073
Int. Cl. A61l 17/00; A63b 51/02; D01f 5/00
U.S. Cl. 8—94.11
6 Claims

ABSTRACT OF THE DISCLOSURE

Absorbable catgut sutures prepared by twisting one or more plies or collagen split from animals intestines have an improved run-down, improved resistance to fraying, improved adhesion between the plies and better resistance to unravelling when prepared by soaking the gut strings in an aqueous gelatin solution just before twisting the plies to form the strings, particularly if the collagen is chromed before twisting.

BACKGROUND OF THE INVENTION

Absorbable surgical sutures are usually presently made from thin long tissues found in the intestinal tracts of animals. The intestinal tissues of sheep or beef particularly are slit into plies, cleaned, fat and other non-collagenous tissue removed and the cleaned plies now often called ribbons are twisted together to form strings and when dried, sterilized and packaged are sutures. U.S. Pat. 1,476,-740, Uyama, Dec. 11, 1923, Process of Manufacturing Catguts describes one such method.

The term "suture" as used herein is intended to include ligatures. A ligature is a string used for tieing whereas a suture is usually used for sewing but inasmuch as the same string may be used for both purposes it has become customary to refer to either as "sutures."

A suture needs to be comparatively flexible as is, to permit flexing during sewing or tieing knots, and additionally needs what is termed as "run-down." The run-down of a suture can be observed by making a single turn of the suture about itself so that half of a square knot is formed near the ends of the suture and then running that half of the square knot down to the wound surface or a test surface. The other half of a square knot is formed and run-down also. Each such half is called a throw. For acceptability to the surgeon or veterinarian the knot must run-down smoothly without fraying in the suture. If two turns are taken about the adjacent strand to form half of a surgeons knot the problem of flexibility and run-down becomes more critical. A surgeon's knot is less apt to slip than a square knot and hence when run-down often need not be held in place while the second throw is being placed over the first throw. Sometimes a surgeon uses three or more throws for knot security.

DESCRIPTION OF THE PRIOR ART

U.S. Pat. 3,098,696, Ball and Vitucci, July 23, 1937, Manufacture of Sterile Surgical Suture Collagen in column two describes certain of the problems associated with run-down.

U.S. Pat. 3,076,365, Taylor and Konazewski, Feb. 5, 1963, Machine for Slitting Tissues, describes one machine and a method for slitting animals intestines to form the plies for the manufacture of catgut sutures.

U.S. Pat. 2,092,512, Herrmann et al., Reabsorbable Threads, Bands, Tubes, and the Like, Sept. 7, 1937, shows the use of lactic acid, glycocoll and a number of other compounds to aid in the "resorption" of glue, catgut, silk, cellulose derivatives and the like when made into threads, bands, and tubes.

U.S. Pat. 1,999,641, Sharp, Apr. 30, 1935, Strand for Suture and Other Purposes and Method of Making the Same, discloses glue or other adhesive to adhere braided fibers of collagen together as sutures, but primarily teaches contacting pure collagen fibers from tendons together and causing them to adhere by their own adherent adhesive properties so that the strand has a smooth outer surface. This patent teaches using carbon tetrachloride or other fat solvents to remove fats and selective enzymes such as lipase and trypsin to dissolve out mucin and elastin leaving behind pure collagen. The fibers are then treated with sodium carbonate, then acidified.

U.S. Pat. 1,949,111, Randall, Feb. 27, 1934, Surgical Suture, discloses a suture of in part animal tissue in part a cellulose compound and an antiseptic binder. Collagen appears to be the binder in the process.

U.S. Pat. 1,254,031, Davis, Jan. 22, 1918, Suture and Method of Making the Same, discloses the use of collagen, glue or a similar substance to cause a close adhesion of braided fibers of animal tendons and to fill up the interstices of a braided strand and provide a smooth, uniform, highly finished coating.

U.S. Pat. 1,168,174, Davis, Jan. 11, 1916, Process for Sterilizing and Preserving Surgical Ligatures, teaches that small amounts of moisture and heat can convert collagen in catgut into gelatin so that the catgut becomes brittle, weakened and twisted. By implication it would appear that if moisture is present during heat sterilization it would tend to degrade the collagen causing it to become weaker but by the same token causing the strands to adhere more uniformly and tenaciously to each other.

U.S. Pat. 221,199, Turner et al., Nov. 4, 1879, Improvement in Processes of Making Strings from Intestines, teaches twisting strands of the intestines of beef cattle into strings and then immersing the strings in a solution of gelatin and acetic acid, among other steps, to give a string for musical instruments. This patent does not teach the strands are useful as sutures.

Collagen is a naturally occuring material which contributes a great deal to the strength of the body tissues. Gelatin is a denatured or degradation product of collagen in which the high degree of crystallinity and orientation exhibited by collagen has degenerated to a more amorphorous nature. The loss of crystallinity is clearly shown by X-rayed diffraction patterns as for example shown in the text "Collagen," N. Ramanathan, Interscience Publishers (New York), 1962. At page 7, photographs of X-ray diffraction patterns show that collagen from beef tendon is highly oriented whereas gelatin is essentially amorphorous.

SUMMARY OF THE INVENTION

It has now been found that by soaking ribbons just prior to spinning in a gelatin solution, particularly if chromicized, the ribbons can be caused to adhere better to each other and thus prevent unraveling of the ribbons, or untwisting if a single ply, and the adhesion is sufficiently better that particularly if the strings are ground to a uniform diameter, or otherwise processed, there is less likelihood of fraying occurring in tieing the sutures, the run-down is better, and a generally more satisfactory suture is obtained.

Even though collagen in the presence of water degrades into gelatin by hydrolysis with acid, with alkali, or aided by heat, the strength and adhesion of the finished ribbons are improved, particularly if the ribbons are chromacized before the gelatin soak, if the ribbons are soaked in gelatin solution just before they are spun. Conveniently the ribbons can be assembled into the number and length of form the finished string, hooks are tied to the ends of the assembly, and just before the twisting step the ribbons are soaked in a gelatin solution. The assembly into the finished strings can be accomplished after the soaking in gelatin, but it is more convenient to have the strands ready to twist with hooks attached at the time they are soaked in the gelatin solution. After soaking in the gelatin solution, the assembled ribbons are twisted to form strings and are dried under tension either by wrapping them on a mandrel or by keeping them on a drying frame under tension during drying; after which the strings are cut to length, the individual lengths are sized to place each suture in the proper size classification and the individual sized strings may be ground so that the suture strands will each have the same uniform diameter throughout their length. Then needles are attached, the sutures are packaged, sterilized and are ready for shipment. The normal packaging, sterilizing, and conditioning fluid techniques are conveniently used, and as these are well known in the art, are not here described in detail.

Although as mentioned above the gelatin treatment may be applied before tieing the individual plys together to form strings, it is more convenient to tie the ribbons together in the configuration which is desired—that is one, two, three, or more ribbons are assembled, with a hook tied on each end, sometimes spoken of as "making the suture," with the strings each being measured to a convenient length. A group of the strings is placed in a gelatin solution.

Conveniently the gelatin solution is about 1% by weight per unit of volume in water. A concentration of from about 0.1 to 5% w./v. gelatin is useful. The soaking is conveniently at room temperature up to about 95° F. for about an hour. The time is not critical, so the soak is conveniently about a minimum of half hour, and the assembled ribbons are soaked until it is convenient to place on the twisting machines. The soaking bath is a convenient place to hold sutures during the processing cycle.

Below about 0.5% of gelatin gives less than maximum improvement and above about 5% may result in gel formation during the application. A soaking for less than one hour results in considerable improvement but a duration of soaking for about one hour is preferred as giving very effective treatment without unnecessarily long holding of the suture.

A quantity of the gelatin solution sufficient to completely cover the plies is preferred. About four liters of solution for 100 full length strands give good results. A full length strand of about 22 feet is a convenient length during the treatment, although any length desired in the finished product, or for processing convenience may be used.

After the one hour soak in the 1% gelatin solution, the assembled plies are twisted in accordance with conventional procedures; the twisted strings are assembled on the standard drying frames the strings are then dried and cut. into lengths after which they are gauged, and polished, needled, packaged, sterilized, conditioning fluid added, followed by sealing or otherwise assembled as may be the conventional practice in a particular plant.

A minor variation in the process is the use of a larger quantity of 1% gelatin solution, after the last wash of the tanning treatment, while the gut ribbons are still in the tanning tank. A larger volume of gelatin solution is needed, but as the gelatin solution is recirculated, the net usage is essentially the same, and an additional treating tank and the transfer to a separate tank can be eliminated. If the soaking is in a flowing recirculated system, immersion of 5 to 15 minutes is sufficient for optimum efficiency.

Similarly, the gelatin treatment can be in the spinning troughs, in plants using underwater twisting procedures.

The actual amount of gelatin remaining on the collagen ribbons after twisting and drying in about one-half to one percent of the total weight, on a dry basis, varying somewhat with the size of ribbons and final strings. More gelatin is lost in entrainment losses in handling than remains on the string, so quantitative measurements are illusory based on consumption of gelatin, and the gelatin has a chemical composition so close to collagen that analysis of the final dried string is not very reliable.

Chromicizing of ribbons before spinning gives a more uniform distribution of the chromium as an oxide in the suture. If the suture is twisted first, the natural adhesion of the ribbons to each other ensures at least reasonably good fray resistance and run-down characteristics. If the ribbons are chromed first, the partial tanning gives better digestion characteristics because the chrome is more uniformly distributed throughout the cross-section of the suture, but the tanning decreases the adhesion of the ribbon during and after twisting. By using a soaking in gelatin, as here described, the advantages of the uniformity of ribbon chromed sutures are combined with the improved fray resistance which can result from string tanning.

By tanning, for sutures, the catgut is chromicized to from about ½% to 1% $Cr_2O_3$. The chromic treatment needs to be very uniform in collagen sutures. The present gelatin treatment before spinning aids in uniformly chromicizing wtihout interfering with good adhesion of the ribbons which is a requirement for grinding and good run-down and fray resistance.

Surgical sutures are usually sized after manufacture, and then ground to a uniform size, just smaller than the applicable size standards maximum. If ground in an aqueous liquid, such as described in U.S. Patent 3,408,773, Cole et al., Nov. 5, 1968, Grinding Machines, a dilute aqueous solution of gelatin can be used on the grinding liquid, or the ground sutures can be wiped rapidly with a gelatin solution, thereby laying flat fuzz or imperfection on the surface of the suture.

The present gelatin treatment can also be used on catgut for musical instruments and sports equipment, such as tennis racquets. For such uses, the tanning can be greater than for absorbable sutures.

The Textile Research Journal for June 1945 at page 201 describes a textile yarn abrasion test, as used at the Bell Telephone Laboratories to secure improved abrasion resistance for telephone cords. Threads are mounted on supporting hooks with a weight at the lower end, and passed around three smooth chromium plated steel pins with a loop around the middle of three pins using 35 strokes per minute ⅞ inch stroke and ⅜ inch pin.

The exact configuration of the machine is not as critical as using the same machine with the same conditions repeatedly to get comparable results.

The results using the Textile Yarn rating device above described resulted in the following results showing the number of oscillations using sutures with and without the 1% gelatin soak treatment just prior to twisting and with all other processing steps being identical.

In a three pin tester, using a center pin offset 1¼ inches, a 1⅝ inch stroke, a complete loop about the center pin, with a 300 gram load on size 0 sutures (U.S.P. XVII) (0.016 inch maximum) a control with conventional non-gelatin spinning lasted an average of 81 cycles. In similar tests sutures, otherwise identical as to manufacture and treatment except using a 1 hour soak in 1% gelatin before treatment lasted an average of 339 cycles. For size 00 sutures, (0.013 inch maximum) the untreated lasted 79 cycles average. The gelatin treated lasted 237 cycles, average.

These tests are representative of the improvement obtained in such a test. The utilization by surgeons in operating room practice, and in tests, indicated a major improvement in run-down characteristics. Such improvement is difficult to describe by significant numbers.

I claim:

1. In the process of preparing absorbable surgical sutures from at least one ribbon of catgut from an animal intestine by splitting the intestine into plies, separating the serosa layer to form a ribbon, chroming the ribbon, assembling at least one ribbon into a string, twisting to form a twisted string, drying the twisted string under tension, and in any order, needling, sterilizing, adding conditioning fluid, and packaging, the improvement comprising: soaking the ribbons after chroming and before twisting in a gelatin in water solution consisting essentially of from 0.1 to 5.0% by weight of gelatin per volume of water.

2. The process of claim 1 in which the untwisted ribbons are soaked at room temperature for approximately at least 5 minutes before twisting.

3. The process of claim 2 in which the concentration of gelatin in the water is approximately 1% by weight per unit of volume.

4. The process of claim 1 in which after twisting and drying the sutures are gauged as to size, and ground to a uniform standard size throughout the length of the suture.

5. The process of claim 4 in which the untwisted ribbons are soaked at room temperature for approximately at least 5 minutes before twisting.

6. The process of claim 5 in which the concentration of gelatin in the water is approximately 1% by weight per unit of volume.

References Cited

UNITED STATES PATENTS

| | | | |
|---|---|---|---|
| 221,199 | 11/1878 | Turner | 128—335.5 |
| 1,764,233 | 6/1930 | Varindis | 128—335.5 |
| 2,039,263 | 4/1936 | Schulte | 117—2 |
| 2,475,697 | 7/1949 | Cresswell | 18—54 |
| 3,413,079 | 11/1968 | Rich | 8—130.1 |

GEORGE F. LESMES, Primary Examiner

JOHN R. MILLER, Assistant Examiner

U.S. Cl. X.R.

128—335.5